US012548469B2

(12) United States Patent
Singapogu et al.

(10) Patent No.: US 12,548,469 B2
(45) Date of Patent: Feb. 10, 2026

(54) METHODS AND SYSTEMS TO QUANTIFY CLINICAL CANNULATION SKILL

(71) Applicant: Clemson University Research Foundation, Clemson, SC (US)

(72) Inventors: Ravikiran Singapogu, Pendleton, SC (US); Zhanhe Liu, Clemson, SC (US); Ziyang Zhang, Clemson, SC (US); Lydia Petersen, Clemson, SC (US); David Moline, Pendleton, SC (US); Devansh Shukla, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 775 days.

(21) Appl. No.: 17/864,545

(22) Filed: Jul. 14, 2022

(65) Prior Publication Data
US 2023/0037654 A1  Feb. 9, 2023

Related U.S. Application Data

(60) Provisional application No. 63/293,404, filed on Dec. 23, 2021, provisional application No. 63/222,091, filed on Jul. 15, 2021.

(51) Int. Cl.
G09B 23/28 (2006.01)
G06F 3/01 (2006.01)

(52) U.S. Cl.
CPC ........... G09B 23/285 (2013.01); G06F 3/014 (2013.01)

(58) Field of Classification Search
CPC .................................................. G09B 23/285
See application file for complete search history.

(56) References Cited

U.S. PATENT DOCUMENTS

2006/0211924 A1* 9/2006 Dalke .................... G16H 40/67
600/326
2009/0177452 A1* 7/2009 Ullrich .................... G06F 3/014
703/11

(Continued)

OTHER PUBLICATIONS

Liu et al. "A Method for Segmenting the Process of Needle Insertion during Simulated Cannulation using Sensor Data" Annu Int Conf IEEE Eng Med Biol Soc, Jul. 2020, 6090-6094.

(Continued)

Primary Examiner — Peter R Egloff
(74) Attorney, Agent, or Firm — Fredrikson & Byron, P.A.

(57) ABSTRACT

Disclosed herein is a system for evaluating a user during a physical cannulation simulation. The system includes a physical cannulation simulator and one or more sensors configured to measure data during the physical cannulation simulation by the user using the physical cannulation simulator. The system further includes one or more processors configured to receive the data measured by each of the one or more sensors and calculate metrics using the data. The one or more processors are further configured to apply a model to the metrics to determine a composite simulation success score and compare the composite simulation success score to a threshold score. In response to comparing the composite simulation success score to the threshold score, the one or more processors are configured to output an indication of one or more of an absolute performance or a relative performance for the first user during the physical cannulation simulation.

20 Claims, 3 Drawing Sheets

(56) References Cited

U.S. PATENT DOCUMENTS

| | | | | |
|---|---|---|---|---|
| 2012/0280988 | A1* | 11/2012 | Lampotang | G09B 23/285 434/262 |
| 2014/0205990 | A1* | 7/2014 | Wellman | G09B 7/00 434/362 |
| 2015/0170532 | A1* | 6/2015 | Yancosek | G09B 7/02 434/258 |
| 2017/0316719 | A1* | 11/2017 | Cull | G09B 23/285 |
| 2019/0090969 | A1* | 3/2019 | Jarc | A61B 34/37 |
| 2022/0180764 | A1* | 6/2022 | Mirchi | G09B 9/00 |

OTHER PUBLICATIONS

Liu et al., "Cannulation Skill Assessment Using Functional Data Analysis" IEEE Journal of Biomedical and Health Informatics, vol. 27, No. 9, Sep. 2023.

Liu et al. "Is Experience in Hemodialysis Cannulation Related to Expertise? A Metrics-based Investigation for Skills Assessment" Annals of Biomedical Engineering, vol. 49, No. 7, Jul. 2021, pp. 1688-1700.

Liu et al. "Examining the Effect of Haptic Factors for Vascular Palpation Skill Assessment Using an Affordable Simulator" IEEE Open Journal of Engineering in Medicine and Biology, vol. 1, 2020.

Liu et al. "Relating process and outcome metrics for meaningful and interpretable cannulation skill assessment: A machine learning paradigm" Science Direct, vol. 236, Jun. 2023.

Peterson et al. "Simulator-Based Metrics for Quantifying Vascular Palpation Skill for Cannulation" IEEE Access, vol. 10, 2022.

Singh et al. "Motion Smoothness Metrics for Cannulation Skill Assessment: What Factors Matter?" Front. Robot. AI, Apr. 2021, vol. 8, article 625003.

Zhang et al. "Needle Angle Matters: An Investigation of the Effect of Needle Angle on Hemodialysis Cannulation Skill" KIDNEY360 4: 962-970, Jul. 2023.

Zhang et al. "Extracting Subtask-specific Metrics Toward Objective Assessment of Needle Insertion Skill for Hemodialysis Cannulation" Journal of Medical Robotics Research, vol. 4, Nos. 3 & 4 (2019) 1942006 (12 pages).

* cited by examiner

METHODS AND SYSTEMS TO QUANTIFY CLINICAL CANNULATION SKILL

CROSS-REFERENCE TO RELATED APPLICATION(S)

This application claims priority to each of U.S. Provisional Application 63/222,091, filed Jul. 15, 2021 and entitled "Methods and Systems to Quantify Clinical Cannulation Skills," and U.S. Provisional Application 63/293,404, filed Dec. 23, 2021 and entitled "Methods and Systems to Quantify Clinical Cannulation Skills," which are hereby incorporated herein by reference in their entirety.

GOVERNMENT SUPPORT

This invention was made with government support under awarded grant number K01 DK111767 by the National Institutes of Health (NIH). The government has certain rights in the invention.

FIELD

The various examples herein relate to medical skill training and evaluation.

BACKGROUND

To receive life-sustaining hemodialysis treatments, patients with end-stage kidney disease (ESKD) may need to be cannulated in their vascular accesses at least 3 times a week in order to access their vascular system. Unfortunately, cannulation is a problem-ridden procedure for multiple reasons including non-standard geometries of arteriovenous fistulas (AVFs), lack of training opportunities for patient care technicians (PCTs) and a high turnover rate among PCTs in dialysis clinics. Lack of cannulation skill results in poor clinical outcomes due to infiltration and other cannulation-related trauma that could potentially lead to an unusable vascular access, which may be an unfavorable event for an ESKD patient. It is estimated that minor infiltration occurs in about 50% of cannulations while major infiltrations occur in 5-7% of cannulations in dialysis clinics. Another negative consequence of inadequate cannulation skill is that it increases reliance on Tunneled Dialysis Catheters (TDCs) whether due to not cannulating usable early fistulas (which usually requires greater skill) or due to a temporarily unusable vascular access. It has also been reported that injury during cannulation to a maturing AVF is associated with high maturation failure rates. Proper cannulation technique can also potentially reduce vessel wall trauma in vascular accesses that could prolong the life of the vascular access. In light of these realities, it is desired that cannulation be performed by skilled clinical personnel in a safe and effective manner since better cannulation skills will positively impact patient outcomes. Unfortunately, training of PCTs and nurses, specifically on the "technical" aspects of cannulation, has traditionally not received much attention. Pre-clinical training typically focuses on didactic instruction with "hands-on" training in cannulation comprising only a few attempts on an intravenous (IV) arm mannequin. These "fake arms" are antiquated tools that have limited value for the purpose of teaching cannulation for hemodialysis since they are unrealistic and cannot simulate a variety of vascular accesses. In addition, recent research has brought to light the fact that even though PCTs and nurses may possess several years of experience, they may remain in a state of being "perpetual novices" because of the lack of effective training options. The high turnover rate among PCTs further requires that training is both effective and efficient.

Simulators have been successfully deployed in many medical specialties for assessment and training of clinical skills. One of the key advantages of simulators is their ability to provide objective feedback of task performance. In addition, the trainee has the benefit of practicing skills in an artificial (simulated), safe, low-stakes environment; honing one's skills in this environment has the benefit of instilling confidence in the learner prior to actual clinical practice. Simulators have been demonstrated as being effective for skill assessment and training, particularly in surgical training, with several studies reporting successful transfer of training from the simulator to the operating room. Regrettably, however, simulators have not been as widely used in nursing, especially in the context of training clinical personnel in the dialysis unit, due to the fact that current products on the market lack objective assessment and training features and fail to be specifically adjusted for dialysis cannulation applications.

BRIEF SUMMARY

Discussed herein are various examples for a system to evaluate a user's cannulation skills during a physical cannulation simulation. Using a variety of sensors that measure data during the physical cannulation simulation, a computing device can receive the data and calculate a variety of metrics indicative of success during the physical cannulation process. The computing device utilizes a model to calculate a composite score based on the various metrics and use that composite score to determine whether the user passed or failed the physical cannulation simulation.

The above system provides a number of benefits. Using the described system, an instructor can ascertain the use of a cannulation simulator for palpation assessment using objective metrics to differentiate experts and novices. The results suggest that vascular palpation may be quantified using objective metrics. In addition, these metrics can demonstrate differences in skill between expert and novice technicians. Experts performed the task more confidently and intentionally, taking a shorter amount of time, having a higher ratio of correct movement, and having a shorter path length. These metrics can be applied in the training of palpation skill by providing objective quantification of palpation behavior. The differentiation of subjects into experts and novices "binarizes" skill into two groups. Skill, however, can be conceptualized as being on a continuum rather than in two (or three) discrete levels. In these ways, the system of physical simulators, sensors, and analyzing modules can improve the efficacy of simulation training for medical professionals by providing accurate, valuable, and near-immediate objective feedback. Additionally, the ability to improve the quality of cannulation in hemodialysis units using simulation techniques will make care more patient-centered since cannulation is important to patients. Also, the ability to cannulate dialysis access grafts and fistulae earlier and without complications will likely reduce the duration of tunneled dialysis catheter contact time, the need for additional endovascular and surgical interventions, and also the cost of care, which is a favorable-win situation for all stakeholders involved in ESKD clinical care.

In Example 1, a system comprises a physical cannulation simulator. The system further comprises one or more sensors, wherein each sensor of the one or more sensors is configured to measure data during a physical cannulation simulation by a first user using the physical cannulation simulator. The system further comprises one or more processors configured to receive the data measured by each of the one or more sensors. The one or more processors are further configured to calculate a plurality of metrics using the data. The one or more processors are also configured to apply a model to the plurality of metrics to determine a composite simulation success score. The one or more processors are further configured to compare the composite simulation success score to a threshold score. The one or more processors are also configured to, in response to comparing the composite simulation success score to the threshold score, output an indication of one or more of an absolute performance or a relative performance for the first user during the physical cannulation simulation.

Example 2 relates to the system of Example 1, wherein the one or more sensors comprise one or more of an optical hand tracking sensor system, a pressure sensor system, an electromagnetic position sensor system, an infrared sensor system, and an external camera system.

Example 3 relates to the system of Example 2, wherein the optical hand tracking sensor system comprises an optical hand tracking sensor module installed above the physical cannulation simulator.

Example 4 relates to the system of any one or more of Examples 2-3, wherein the pressure sensor system includes an arrangement of one or more pressure sensors wearable on a hand of the first user, wherein the arrangement of one or more pressure sensors includes a pressure sensor set on a tip of each of one or more fingers of the hand of the first user when worn on the hand of the first user.

Example 5 relates to the system of any one or more of Examples 2-4, wherein the electromagnetic position sensor system comprises an electromagnetic position generator located external to the physical cannulation simulator and an electromagnetic position sensor located inside or on a needle held by the user during the physical cannulation simulation.

Example 6 relates to the system of any one or more of Examples 2-5, wherein the infrared sensor system comprises one or more infrared emitters located within the physical cannulation simulator and an infrared sensor located in a needle held by the user during the physical cannulation simulation.

Example 7 relates to the system of any one or more of Examples 1-6, wherein the data comprises one or more of hand position data, finger position data, needle insertion pressure data, time series data, touchpoint data, force data, needle location data, needle presence data, and needle movement data.

Example 8 relates to the system of any one or more of Examples 1-7, wherein the one or more processors are further configured to extract, based on an initial calibration for each of the one or more sensors and segmentation of the data, a threshold for each of the plurality of metrics.

Example 9 relates to the system of any one or more of Examples 1-7, wherein each metric of the plurality of metrics comprises one or more of a time metric, a location metric, a force metric, a statistical feature, and a threshold selection feature.

Example 10 relates to the system of Example 9, wherein the time metric comprises one or more of a total time from a start of a palpation to an end of the palpation, and a total duration of a needle tip moving under a skin surface of the physical cannulation simulator.

Example 11 relates to the system of any one or more of Examples 9-10, wherein the location metric comprises one or more of a ratio of correct movement, a ratio of accurate touchpoints, a path length, a distance to motor, a needle tip path length, an average needle angle, and a velocity profile.

Example 12 relates to the system of any one or more of Examples 9-11, wherein the force metric comprises one or more of a touchpoint total, a touch frequency, a touchpoint time, a touchpoint force, a force integration, a jerk metric and a pinch force metric.

Example 13 relates to the system of any one or more of Examples 9-12, wherein the statistical feature comprises one or more of an average absolute difference between each metric and a mean value for the respective metric, an average of a root sum of squares for each metric, and an average difference between each metric and the mean value for the respective metric.

Example 14 relates to the system of any one or more of Examples 9-13, wherein the threshold selection feature comprises one or more of an indication of a hesitation before reaching a first flashback, an indication of a fast needle steering motion, an indication of more than a threshold number of major peaks in pinch force data, an incorrect judgment of a fistula location, an indication of infiltration danger, and a dangerous infiltration angle.

Example 15 relates to the system of any one or more of Examples 1-14, wherein the model comprises a series of weights to apply to each metric of the plurality of metrics.

Example 16 relates to the system of any one or more of Examples 1-15, wherein the model comprises a machine learning model.

Example 17 relates to the system of Example 16, wherein the one or more processors are further configured to, after outputting the indication of the one or more of the absolute performance or the relative performance for the first user during the physical cannulation simulation, receive an input as to whether the first user passed or failed the physical cannulation simulation, and adjust the model based on the input as to whether the indication of the first user passed or failed the physical cannulation simulation and the comparison of the composite simulation success score to the threshold score.

Example 18 relates to the system of any one or more of Examples 1-17, wherein the one or more sensors comprise an infrared sensor system, wherein the infrared sensor system comprises an infrared detector in or on a needle tip and a plurality of infrared emitters arranged throughout a simulated fistula (or blood vessel) within the physical cannulation simulator, and wherein the one or more processors are further configured to estimate a needle tip location based on data received from the infrared detector.

Example 19 relates to the system of Example 18, wherein the plurality of infrared emitters comprises a series of infrared emitters that are each actuated at different frequencies.

Example 20 relates to the system of Example 19, wherein the data received from the infrared detector comprises voltage data, wherein the series of infrared emitters are arranged in order of increasing frequency, and wherein the one or more processors are further configured to compare the voltage data to a voltage model trained based at least in part on one or more characteristics of the series of infrared emitters, spacing measurements between each infrared emitter in the series of infrared emitters, and one or more characteristics of the infrared detector. The one or more processors are also configured to determine an X-Y-Z position of the infrared detector within the simulated fistula based on the comparison of voltage data and the voltage model.

Example 21 relates to the system of Example 20, wherein the voltage data comprises a series of voltage measurements captured at different moments throughout the physical cannulation simulation, and wherein the X-Y-Z position of the infrared detector within the simulated fistula comprises a series of X-Y-Z positions of the infrared detector within the simulated fistula at the different moments throughout the physical cannulation simulation.

Example 22 relates to a method to quantify cannulation skills on a physical cannulation simulator, the method comprising measuring, by one or more sensors, data during a physical cannulation simulation by a first user using the physical cannulation simulator. The method further comprises receiving, by one or more processors, the data measured by each of the one or more sensors. The method also comprises calculating, by the one or more processors, a plurality of metrics using the data. The method further comprises applying, by the one or more processors, a model to the plurality of metrics to determine a composite simulation success score. The method also comprises comparing, by the one or more processors, the composite simulation success score to a threshold score. The method further comprises, in response to comparing the composite simulation success score to the threshold score, outputting, by the one or more processors, an indication of one or more of an absolute performance or a relative performance for the first user during the physical cannulation simulation.

Example 23 relates to the method of Example 22, further comprising steps performed by the system of any one or more of examples 1-21.

Example 24 relates to a non-transitory computer-readable storage medium comprising instructions that, when executed, cause one or more processors to receive data measured by each of one or more sensors during a physical cannulation simulation by a first user using the physical cannulation simulator. The instructions, when executed, further cause the one or more processors to calculate a plurality of metrics using the data. The instructions, when executed, further cause the one or more processors to apply a model to the plurality of metrics to determine a composite simulation success score. The instructions, when executed, further cause the one or more processors to compare the composite simulation success score to a threshold score. The instructions, when executed, further cause the one or more processors to, in response to comparing the composite simulation success score to the threshold score, output an indication of one or more of an absolute performance or a relative performance for the first user during the physical cannulation simulation.

Example 25 relates to the non-transitory computer-readable storage medium of Example 24, wherein the instructions, when executed, further cause the one or more processors to perform the steps performed by the system of any one or more of examples 1-21.

Example 26 relates to any of the techniques described herein.

While multiple examples are disclosed, still other examples will become apparent to those skilled in the art from the following detailed description, which shows and describes illustrative examples. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

Figure 1:
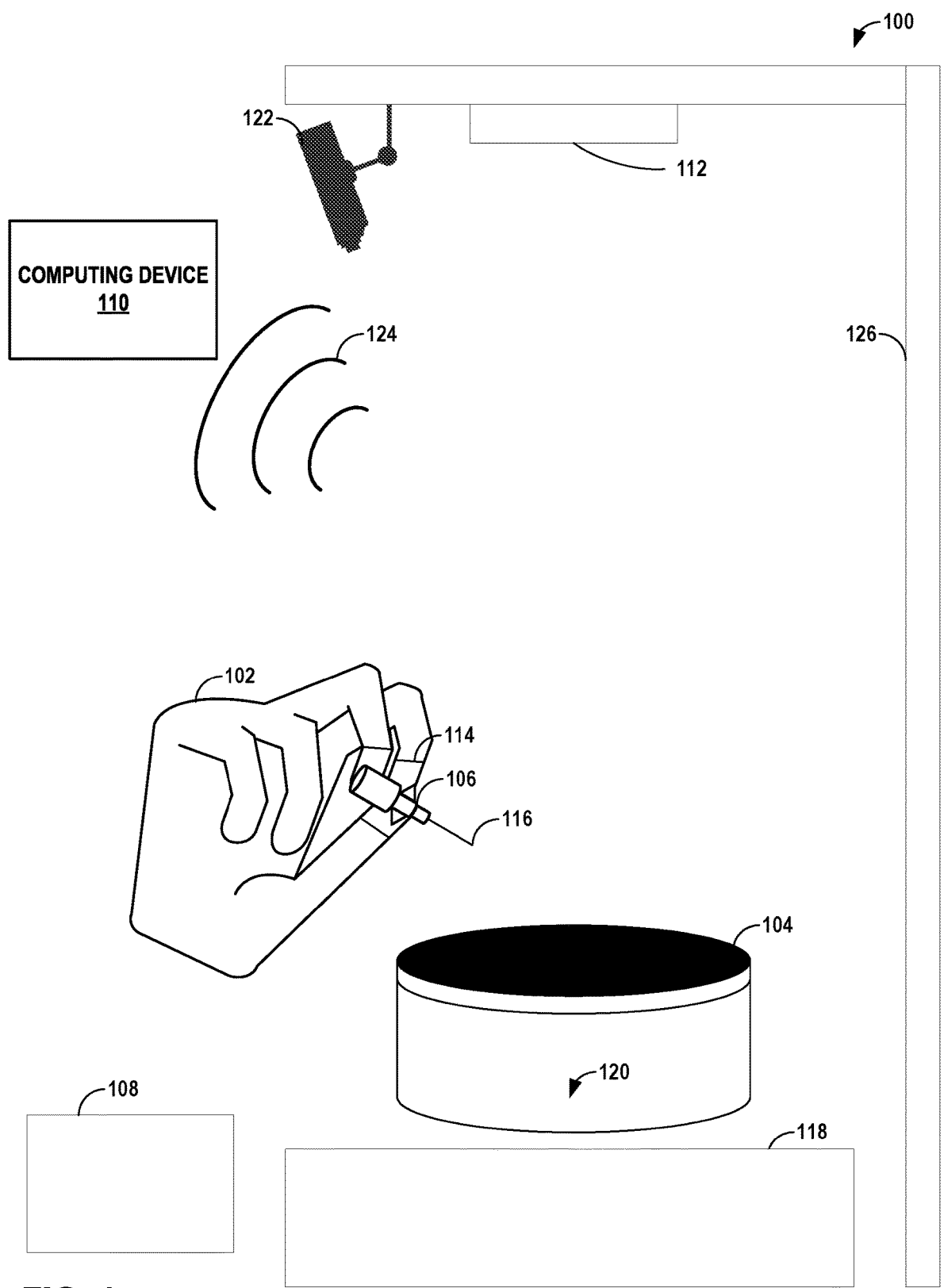
FIG. 1 is a conceptual diagram illustrating a physical cannulation simulator that includes sensors and a computing device configured to analyze data produced by the sensors to assess a user's performance during a physical cannulation simulation, in accordance with the techniques described herein.

FIG. 1 is a conceptual diagram illustrating a physical cannulation simulator system 100 that includes sensors 112, 114, 116, 118, 120, and 122, and a computing device 110 configured to analyze data produced by the sensors to assess a user's performance during a physical cannulation simulation, in accordance with the techniques described herein. Physical cannulation simulator system 100 may be utilized by a user, such as a user with hand 102, to perform a physical cannulation simulation that may be helpful for training purposes as various clinicians and other medical professionals train to perform cannulation procedures without subjecting actual patients to the pricks and punctures that occur during a cannulation procedure.

The example of FIG. 1 includes physical cannulation simulator 104. Physical cannulation simulator 104 may be any device with a surface penetrable by a needle, such as cannulation needle 106, in order to give the user an experience similar to performing a cannulation on a human patient. For instance, physical cannulation simulator may be an object that includes at least one surface made of a simulated skin, such as an animal skin or a synthetic elastomer, that is tightened and filled such that the surface has properties similar to human skin. In some instances, the simulated skin surface may be replaceable such that the same physical cannulation simulator device can be reused after the surface has been punctured by cannulation needle 106. Inside physical cannulation simulator 104 may be any of a variety of sensors, including infrared emitters 120, to provide feedback to control box 108 and/or computing device 110.

Cannulation needle 106 may be any needle similar to those used to perform actual cannulation procedures. For instance, cannulation needle 106 may be shaped and weighted in a manner that is similar to needles used in live cannulation procedures. In some instances, cannulation needle 106 may include one or more needle sensors 116 inside the tip of the needle or on a surface of the needle portion of cannulation needle 106.

In some instances, physical cannulation simulator system 100 may include control box 108. In some instances, control box 108 may be any type of computing device that can receive signals 124 from various sensors within physical cannulation simulator system 100. Control box 108 may compile signals 124 and forward signals 124 to computing device 110 for analysis. In other instances, control box 108 may analyze the data received from the variety of sensors itself, performing the tasks hereby attributed to computing device 110. In still other instances, control box 108 may not be included in physical cannulation simulator system 100, with the various sensors communicating directly with computing device 110 with signals 124.

Computing device 110 may be any computer with the processing power required to adequately execute the techniques described herein. For instance, computing device 110 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein. Computing device 110 may receive sensor data either directly from the variety of sensors in physical cannulation simulator system 100 or from control box 108 in a compiled form.

As stated above, physical cannulation simulator system 100 may include a variety of sensors. For instance, physical cannulation simulator system 100 may include optical hand tracking sensor system 112. Optical hand tracking sensor system 112 may be installed onto frame 126 that extends above physical cannulation simulator 104 and may be directed downwards towards physical cannulation simulator 104. As such, optical hand tracking sensor system 112 may include one or more motion tracking sensors in an optical hand tracking sensor module that can identify hand 102 and track hand 102 as it moves in the vicinity of physical cannulation simulator 104. Optical hand tracking sensor system 112 may generate motion data and tracking data that is transmitted to either control box 108 or computing device 110 for analysis.

Physical cannulation simulator system 100 may also include pressure sensor system 114. Pressure sensor system 114 may include one or more pressure sensors, with each pressure sensor being attached to a hand garment or hand covering that is worn on hand 102 and with each pressure sensor corresponding to a particular digit of hand 102. For instance, pressure sensor system 114 may include three different pressure sensors, one on each of a thumb, an index finger, and a middle finger of hand 102. In other instances, pressure sensor system 114 may only include pressure sensors on an index finger, an index finger and a thumb, on all five fingers, or any combination of fingers that may produce adequate pressure information. In some instances, a user may have a pressure sensor system 114 on each hand such that pressure information can be gathered for pressure onto cannulation needle 106 as well as the simulated skin surface of physical cannulation simulator 104.

Physical cannulation simulator system 100 may also include one or more needle sensors 116 located either within a needle portion of cannulation needle 106 or on a surface of the needle portion of cannulation needle 106. Needle sensors 116 may include an infrared detector. The infrared detector may include a sensor configured to detect infrared light emitted by an infrared emitter, such as infrared emitters 120. In this way, if infrared emitters 120 are positioned to mimic a location of a fistula within physical cannulation simulator 104, the infrared detector may detect the emitted infrared light once cannulation needle is in the proper position. Additionally or alternatively, needle sensors 116 may include an electromagnetic sensor configured to work with electromagnetic position sensor system 118. The electromagnetic sensor may detect emitted electromagnetic energy, with the strength of the detected energy enabling the electromagnetic sensor to determine or convey position and location information to control box 108 or computing device 110.

Physical cannulation simulator system 100 may also include electromagnetic position sensor system 118. Electromagnetic position sensor system 118 may emit electromagnetic energy in a way that the particular magnitude of the energy, as picked up by an electromagnetic sensor, such as that included in needle sensors 116, can imply positional and location information of the electromagnetic sensor. As the electromagnetic sensor is incorporated into cannulation needle 106 and the electromagnetic position sensor system 118 is in a consistent position, the location information of the electromagnetic sensor may indicate the position of cannulation needle 106.

Physical cannulation simulator system 100 may also include infrared emitters 120. As described above, infrared emitters 120 may work with an infrared sensor in needle sensors 116 to provide information as to whether cannulation needle 106 is in the correct location. For instance, infrared emitters 120 may be arranged to simulate one or more fistula within physical cannulation simulator 104, including being located at a depth within physical cannulation simulator 104 that may correspond to a typical depth beneath the skin of a fistula in a human subject. As such, once cannulation needle 106 is moved to be within the simulated fistula at the correct depth, the infrared sensor in needle sensors 116 may detect the infrared light emitted by infrared emitters 120 to indicate that cannulation needle 106 is at the correct location and at the correct depth.

Physical cannulation simulator system 100 may also include external camera system 122. External camera system 122 may be fixed, in some instances, to frame 126. In other instances, external camera system 122 may be located at any space that has a clear view of physical cannulation simulator 104 and hand 102 such that external camera system 122 can capture video of the physical cannulation simulation process.

Any of sensors 112, 114, 116, 118, 120, and 122 can generate instances of signals 124 to transmit data to one of control box 108 and computing device 110. Signals 124 may take the form of any wired or wireless communication that enables the sensors to communicate the measured data with control box 108 or computing device 110. Signals 124 may follow various protocols for such transmissions, including WiFi®, Bluetooth®, ZigBee®, cellular, radio, or any other wired or wireless protocol.

In accordance with the techniques described herein, any one or more of sensors 112, 114, 116, 118, 120, and 122 may measure data during a physical cannulation simulation performed on physical cannulation simulator 104. The sensors may transmit the data to control box 108 or computing device 110 by transmitting signals 124. Computing device 110 receives signals 124 and the data measured by each of the one or more sensors. Computing device 110 calculates a plurality of metrics using the data. Computing device 110 applies a model to the plurality of metrics to determine a composite simulation success score. Computing device 110 compares the composite simulation success score to a threshold score. In response to comparing the composite simulation success score to the threshold score, computing device 110 outputs an indication of one or more of an absolute performance or a relative performance for the first user during the physical cannulation simulation.

A custom designed cannulation simulator was designed for use with these techniques consisting of three primary components: simulator hardware, sensing systems, and a control unit. However, any physical cannulation simulator can be used for the purposes of this disclosure, so long as the sensors that provide the adequate data are present. The simulator body may be a 3D printed frame that allows the simulator body to be rotated 360-degrees. There may be up to four or more cannulation modules on each side of the rotatable frame as shown. Each cannulation module may be filled with foam to simulate body mass. Fistula models with distinct geometric properties made of silicone gel may be placed within the foam. There may be a variety of fistulas with the various properties, including straight or curved and between 5 and 11 millimeters (e.g., 7 mm or 9 mm), although other sizes may be utilized for certain circumstances.

Within each fistula model, a vibration motor may be embedded to render feedback for palpation. By controlling the power and frequency of the vibration, the characteristic "thrill" haptic sensation of blood flow in an AVF is simulated. An optical hand tracking sensor may be attached to a pole above the cannulation platform to capture subjects' hand movements during palpation. Furthermore, the pressure sensor force recording system may be used to record forces exerted on the surface during palpation. Three finger sleeves may be placed on the user's thumb, index finger, and middle finger since these three fingers are most used during cannulation, although other fingers can also be covered. In addition to the motor, an infrared (IR) emitter-detector system may be embedded inside the fistula to identify whether the needle was inserted into the fistula model. Based on the IR detector's voltage, a red LED may light up to mimic the blood flashback during clinical cannulation. On top of the foam and fistula model, a layer of artificial skin was placed. To track the motion of the needle throughout the cannulation process, an electromagnetic (EM) tracking system may be used. The sensor may be fixed inside a 15G dialysis needle, with the field generator facing the cannulation platform for motion capture. A web camera may be placed outside of the simulator area to record the cannulation process for review.

Segmentation may be performed to isolate sensor data during the palpation portion. The start time of palpation ($T_{start}$) may be defined as the time when force was applied to the index or middle finger after a period of no change in force. The initial period of accounting for no change in force is designed to detect trials where the user was not in the starting hand position. The end time of palpation ($T_{end}$) may be found by searching for a change in force applied by the thumb in conjunction with a movement of the needle since typically at the end of palpation, the needle will be gripped by the subject for insertion, resulting in pinch forces and needle movement. This segmentation strategy works for the typical palpation trial where the subject palpates with the index and middle fingers, while the needle is held or placed relatively still.

Metrics are split up into three types: the time metric, location metrics, and force metrics.

Time Metric: (Time) is the total time from the start of palpation to the end.

$$\text{Time} = T_{end} - T_{start} \tag{1}$$

Location Metrics: Per Trial:

The Ratio of Correct Movement (RCM) is defined by the number of velocity projections that are in the direction of the motor over the total number of significant movements:

$$RCM = \frac{\sum_{n=1}^{T} f(V_p(n))}{\sum_{n=1}^{T} f(|V_p(n)|)} * 100\%$$

$$f(V_p(n)) = \begin{cases} 1, & \text{if } V_p(n) > 20 \text{ mm/s} \\ 0, & \text{otherwise} \end{cases}$$

The Ratio of Accurate Touchpoints (RATP) is the number of touchpoints within 40 mm of the motor simulating anastomosis over the total number of touchpoints:

$$RATP = \frac{\sum_{n=1}^{T} f(TPD(n))}{\sum_{n=1}^{T} TPD(n)} * 100\%$$

$$f(TPD(n)) = \begin{cases} 1, & \text{if } TPD(n) < 40 \text{ mm} \\ 0, & \text{otherwise} \end{cases}$$

Path Length is the total distance the index finger moves during palpation:

$$PL = \sum_{n=1}^{T-1} (x_{n+1} - x_n)^2 + (y_{n+1} - y_n)^2 \tag{4}$$

Per touchpoint: Distance to motor (TPD) is the distance from a touchpoint to the motor that is activated:

$$TPD = (x_{tp} - x_m)^2 + (y_{tp} - y_m)^2$$

Force Metrics: Per Trial:

Touchpoints is the total number of touchpoints during palpation, defined by the number of peaks in the force profile of the subject and indicates the number of times there was applied pressure to the surface of the simulator bed during palpation.

Touch Frequency (Frequency) is the number of touchpoints recorded per second, $$\text{Frequency} = \frac{\text{Touchpoints}}{\text{Time}} \tag{6}$$

Per Touchpoint:

Touchpoint Time (TPT) is the dwell time, or the amount of time the subject spends at each touchpoint and is found by the width of the force peak found with MATLAB's findpeaks function.

Touchpoint Force (TPF) is the force applied at a touchpoint, $F_{ind+mid}$ at $t_{TP}$, where $t_{TP}$ is the timestamp of each of the peaks identified by the findpeaks function.

To the extent that any particular values for any of these metrics are articulated below, it is to be understood that these values are the results of a single study. Different studies may produce different values, and these values are only included as a proof of concept for the techniques described herein.

The median Time of palpation for experts and novices were 9.28 s and 15.7 s, respectively. The difference was significant according to the Mann-Whitney test with a p-value=0.001.

When observing the distance (TPD) of each touchpoint to the motor, experts demonstrated a median of 53.7 mm, while novices had a median of 85.0 mm. A Mann-Whitney test determined a significant difference with a p-value<0.001. The mean RCM of experts was 73.4% (SD: 18.5), and the mean RCM of novices was 65.2% (SD: 13.4). The differences were found to be significant using a two-sample t-test with a p-value=0.035. The mean RATP of experts was 38.7% (SD: 23.4), and the mean RATP of novices was 26.5% (SD: 19.8). A two-sample t-test found a p-value of 0.021, indicating a significant difference.

The mean expert Path Length was 992 mm (SD: 625), and the novices had a mean value of 1551 mm (SD: 816). A two-sample t-test showed a significant difference with a p-value=0.004.

The median number of Touchpoints of experts was 12, while the novices had a median of 22 Touchpoints. The Mann-Whitney test showed a significant difference with a p-value<0.001. The experts had a mean touch Frequency of 1.20 Hz (SD: 0.43) while the novices had a mean of 1.39 Hz (SD: 0.48). A two-sample t-test suggests a significant difference with a p-value=0.017. The difference in expert and novice median TPT was minimal but significantly different, with an expert median TPT of 0.394 s and novice median TPT of 0.339 s. A p-value of 0.002 was observed with a Mann-Whitney test.

The median TPF applied by experts was 0.738 N while the novices applied a median of 0.840 N. The Mann-Whitney test performed showed a significant difference with p-value<0.001.

Experts tended to palpate for shorter Time (p-value: 0.001). For location-based metrics, they palpated closer to the motor (lower TPD, p-value<0.001), have shorter Path-Length (p-value: 0.004), higher Ratio of Correct Movement (RCM) (p-value: 0.035), and a higher Ratio of Accurate Touchpoints (RATP) (p-value: 0.021). Concerning force-based metrics, experts palpated at a lower Frequency (P-value: 0.017) and had fewer Touchpoints (p-value: <0.001) per trial but had higher dwell time at each touchpoint (TPT) (p-value: 0.002). They also applied less force at each touchpoint (TPF) (p-value: <0.001).

Additionally, a number of sub-tasks are also recognized for the cannulation simulation process. Some key events are critical for labeling sub-tasks during cannulation: the starting point of inserting the needle, the time when flashback is witnessed, and the moment of leveling out the needle. The insertion starting point ($T_{start}$) can be described as the short pause right before inserting the needle into the skin surface. Since the short pause is used by participants to ensure the cannulation site is accurate, it not only marks the beginning of needle insertion, but also provides information on the participants' success in locating the optimal cannulation site from the palpation exam.

The needle flash point ($T_{flash}$) is defined as the time that participants first receive steady flashback. $V_{IR}$ stands for the filtered voltage reading from the IR detector and $IR_{th}$ is the voltage threshold for identifying whether the LED should be turned on. The leveling out point ($T_{level}$) is described as when participants start to adjust and push the needle into a secured position after seeing flashback. Such movement can be found by locating local maxima and minima on the needle velocity profile v(t). Because participants need to advance the needle at an angle that is different from the one used for needle entry, it is expected that there is a local maximum on the finger force profile near this time point as well.

These values can further distinguish between expert, intermediate, and novice participants. For a general expert participant, the first flashback may occur around 19.34 s. There may be one major peak on the velocity profile representing a swift needle insertion around 19 s, right before the needle flash point. After flashback, another major peak may be seen on the velocity profile that is accompanied by an almost simultaneous peak on the force profile. This was produced by the subconscious movement of squeezing the wings of the needle to level out the needle angle and to push it into a secured position. The start of the leveling out movement is identified as the adjacent local minimum (19.95 s) before the major peak on the velocity profile. This clip of data describes a clean, swift, and efficient cannulation trial which is preferred during training. The number of major peaks on the velocity profiles are calculated based on the specific sub-task time segment of the cannulation procedure. For the expert participant, the number of extra movements before the needle flash point and after the leveling out point is very limited.

For an intermediate cannulation skill participant, at time 26.84 s the needle flash point is marked by the first sight of steady flashback. Before this point, there may be one major local maximum (Insertion Attempt 1) recognized on the velocity profile and only temporary flashback is observed. Although there is one local maximum of velocity after the needle flash point, the pattern may be considered to fit the insertion motion instead of needle leveling out. For this specific participant, the movement of leveling out is constantly skipped. Another discovery is that the number of local maxima of the velocity profile before the needle flash point is more sporadic (median=2).

For a cannulation trial by a novice participant, there may be no steady and constant flashback according to the IR voltage level, although there is a brief period in which the voltage of the IR detector indicates that the needle was in the AVF model. A brief flashback which goes away immediately after fits the pattern of needle infiltration. During this trial, the participant made three attempts and each attempt can be identified by combining needle tip depth, total finger force, and velocity profiles. Future effort is needed to systematically quantify these attempts. Compared to the examples of the other two participants, this was far from a successful cannulation.

There may also be additional objective metrics. A first metric, flash efficiency (eff), is designed to measure the efficiency with which participants obtained flashback during the whole task. The definition of flash efficiency is:

$$eff = \frac{D_{flash}}{T_{end} - T_{entry}}$$

The second metric, number of attempts (#att), counts the number of times the needle was pulled out and reinserted into the simulator after the first insertion. By default, the metric is instantiated at 1 since every trial has at least one attempt. A number greater than one—more than one insertion attempt—is undesirable per KDOQI guidelines.

The third metric, stb, is a binary indicator regarding attainment of stable flashback: 0 stands for failure to maintain stable flashback and 1 stands for the ability to maintain stable flashback. The criteria of stable flashback is that there is at least 2 seconds of flashback without any interruption until the end of a trial (i.e., when participants signal completion of trial to operators).

The last metric, number of infiltrations (#infil), estimates the number of times the needle perforated the vascular access by detecting the number of times flashback occurs and then disappears during the insertion process. Each occurrence of this behavior is counted as one infiltration. Per KDOQI guidelines, infiltration ought to be avoided because it often results in bruising and/or pain in addition to adverse clinical complications. Note that it is entirely possible for a subject to record multiple infiltrations but to ultimately obtain stable flashback.

Based on these metrics that measure specific aspects of cannulation outcome, one example of a composite metric for measuring overall success of cannulation can be derived. For instance, ocScore may be defined as:

$$\text{ocScore} = \text{eff}(1-0.25(I[\#att>1]+I[\#infil>1]+I[stb]))$$

While this is one example of a composite success score, when more metrics or variables are introduced to the system, the equation may be adjusted in order to account for the additional (or fewer) metrics.

The range of ocScore, in this particular instance, is [0,1], although other suitable ranges ([0, 10], [0, 100], [0, 50], or any other suitable range) could also be utilized with the techniques described herein. As per the KDOQI guidelines, perfect cannulation may be defined as one insertion attempt with stable flashback and no needle infiltrations while minimizing patient pain. Ideal cannulation may be expected when flash efficiency is at 100%, with only one insertion attempt, stable flashback, and no infiltration. However, due to the definition of flash efficiency, it is impossible to reach 100% efficiency. Effective cannulation, however, will yield ocScore values closer to 1. Note also that adverse events like infiltration and/or more than one insertion attempts are penalized in how ocScore is formulated, as these are errors that should be avoided. From a patient perspective, the quantities measured toward computing ocScore have implications for patient pain and comfort. That is, one or more adverse behaviors (e.g., more than one cannulation attempt) results in real pain and discomfort for the patient.

In addition to objective assessment of cannulation performance on the simulator, professionals may also monitor the assessment to provide a subjective assessment by expert nurses during cannulation on the simulator. These experts may provide subjective feedback to indicate whether the prediction using the sensors was correct. In instances where the techniques of this disclosure utilize machine learning, the experts may provide input to the system that adjusts either the weights, thresholds, or sensor calibration based on whether the expert feedback aligns with the predicted score.

Examples of additional metrics include statistical features with force and needle velocity. Using basic statistical features can help identify skills. Therefore, there may be upwards of three or more metrics in this category, including average absolute difference (AAD), average root sum of squared level (ARS), and average root square difference (ARD), alongside the average (Avg) and standard deviation (SD). All three metrics may be used, for example, on both velocity data and pinch force data.

Since unnecessary movement under the skin's surface may cause tissue damage, the metrics may further include features that describe cannulation behaviors when the needle is located under the skin's surface. Specifically, time ($t_u$), needle tip path length ($PL_u$), force integration ($FI_u$), and average needle angle ($Angle_u$) are included in this study.

A type of motion smoothness metrics, particularly built on the third derivative of location data, may be effective in quantifying motor learning. Since performing such a medical task is a type of motor learning, metrics like this may be valuable. Log dimensionless jerk (LDLJ) and spectral arc length (SPARC) may be produced based on needle tip velocity. Other than using location data, the roughness of pinch force data (Frgh) may also calculated based on finite difference (second-order backward).

To measure how close participants' estimates of point of maximum vibration were to the actual location, the system has defined a metric called accuracy, calculated as the distance (in millimeters) from the actual target location to reported fingertip location. For this, the lesser of the respective distances between actual location and index finger, and actual finger and middle finger is chosen. In general, the area of a fingertip is encompassed in a circular area with r=10 mm. Thus, any location estimates within a circular area of r=10 mm were considered as accurate estimates. Furthermore, location estimates that were marginally accurate may be defined as those outside the r=10 mm range but within a circular range of r=30 mm. Finally, estimates that were beyond the r=30 mm range were considered to be errors. It is to be noted that accuracy is an outcome, not process measure and, as such, measures the "how well" but not the "how" of palpation. As an accuracy-based outcome measure, accuracy may be defined as an indicator of whether subjects' final estimate of the location of the target was within 30 mm of the actual target. As an accuracy-based process measure, an error rate may be calculated, defined as the ratio of error frames to total movement frames within one trial.

From sensor location data, the velocity of finger-tip movement was calculated. From this, a metric was devised that determined whether, at any given instant, the participant was palpating towards or away from the actual location of stimulus. Such a metric may be useful for real time guidance and training of palpation skill. To compute the ratio of correct movement (RCM) $P_{tot}$ represents the total recorded path while the straight line $P_0$ connecting the current fingertip location and exact fistula location is the shortest path to complete the task. Recorded velocity $V_r$ is then projected onto the line $P_0$ to get a new vector $V_p$ as the projected velocity at any time which indicates the "true" velocity towards the target. If the projected velocity is positive, test participants are moving in the correct direction (towards the point of vibration stimulus); otherwise, they are moving away from the target.

For each metric other than accuracy, a regression model (linear mixed model) was constructed with the metric as the dependent variable and each factor as independent variables in the form:

$$y_{ij} = \mu_j + \alpha_1 I_{i1} + \alpha_2 I_{i2} + \alpha_3 I_{i3} + \text{residual}_{ij}$$

In this equation, $y_{ij}$ is the estimated value; $\mu_j$ is the participant specific mean; $I_i$ represents the status of one of the environment variables, including vibration type, vibration intensity and skin thickness. The level of significance was set to be 0.05.

The metric accuracy is a binary outcome and typical linear mixed modeling is not appropriate for such coarsely observed metrics. In light of this, for the analysis of the accuracy measures, a logistic generalized linear mixed model (GLMM) is employed, the GLMM consisting of two primary components: the linear predictor and a transformation, which can be written in the form:

$$\eta_{ij} = \alpha_{0j} + \alpha_1 I_{i1} + \alpha_2 I_{i2} + \alpha_3 I_{i3}$$

$$\pi_{ij} = \frac{e^{\eta_{ij}}}{1 + e^{\eta_{ij}}}$$

where $\alpha_{0j}$ accommodates the participant specific differences in probability of being accurate by allowing each participant to have their own overall probability and the remaining $\alpha_k$ terms correspond to treatment level effects on the probability of being accurate. The odds ratio is:

$$\text{odds}_{i'i} = \frac{\frac{x_{i'j}}{(1-\pi_{i'j})}}{\frac{\pi_{ij}}{(1-\pi_{ij})}}$$

If the odds ratio is greater than 1 then it can be concluded that changing the design level from i to i' increases the probability of being accurate; if it is less than 1 it decreases.

Additionally, in an ideal, smooth motion, acceleration may not have any discontinuities, as could be determined by the derivative of acceleration, jerk. This notion has served as the key idea for quantifying motion smoothness. However, computing "pure" jerk is too inconsistent to be used as a measure of motion smoothness. It was observed that jerk may be normalized as it depends heavily on movement duration and range of motion and that minimizing jerk is essential for smooth motion quantification.

This metric, known as dimensionless jerk, accounted for measuring the intermittency in motion regardless of its duration or amplitude. Intermittency in a discrete motion can arise from the lack of controlled movement, characterized by a period of deceleration preceding a point of acceleration, or can be due to finite periods of no motion from uncertainty. For a motion smoothness metric to be valid, it may have the following features: it may be dimensionless, monotonically responsive to motion, sensitive to changes in movement, and feasible for computation.

Another motion metric is spectral arc length. The metric is derived from the arc length of the amplitude of the frequency-normalized Fourier magnitude spectrum of the velocity profile. This metric is based on the observation that smooth hand movements will yield small magnitudes of low-frequency profiles, whereas "unsmooth" movements will yield large magnitudes of different higher-frequency profiles. The larger the magnitudes of different frequency movements are, the more the arc length of the profile increases. This idea is analogous to minimizing the cost function of jerk. Since this metric relies on analyzing motion via the frequency domain, it is more robust to noise and sensitive to changes in smaller movements. SPARC is being increasingly used to measure skilled or smooth motion, in which it consistently demonstrates strong correlations to skill between experts and novices.

While motion smoothness is able to offer accumulative metrics to quantify the overall level of skillfulness for the entire trial process, the frequency domain provides a different view in terms of motion characteristics. Discrete Fourier transform (DFT) and discrete cosine transform (DCT) has been used to assess surgical skills and proved to be highly effective. DCT and DFT may be applied to the time series of needle location, sensor rotation/orientation, and total pinch force. Because of the nature of human operation, only frequency components under 20 Hz were considered. Unlike studies that target longer surgical procedures, the techniques described herein may not apply a uniform length of sliding window to time series data. Both DCT and DFT were applied to data with the length of each trial. Therefore, it may be meaningless to compare the frequency components without the context of their corresponding frequencies. For each trial, the frequency components were ranked based on power (i.e., magnitude), then the ones that rank in the top 10 may be chosen to form a 20-element vector, which includes their power and corresponding frequency.

The metrics may further include functional data analysis (FDA) features. According to KDOQI guidelines, the needle entry angle should be set between 20 and 35 degrees. One single value of insertion angle is often used to summarize behaviors that last for a period of time. The actual needle path trajectory can be just as important as the angle in improving clinical outcomes. To further reveal how the needle angle can help deliver better outcomes, the techniques described herein may analyze the shape of the time series curves that represent the trajectory angle of the needle tip defined in. Just as skills are conventionally divided into three classes (novice, intermediate, and expert), the shape of the curves is grouped into three clusters. Each cluster stands for a general shape, reflecting a certain style of cannulation. A fuzzy C means clustering algorithm is applied in this functional data analysis via the scikit-fda python package. Each curve's clustering result is stored in a 1 by 3 vector, of which each element represents the membership probability.

The cannulation simulator consists of needle motion tracking, via electromagnetic sensors. Additionally or alternatively, including a video camera as well as an infrared detector/emitter allows the system to properly segment the cannulation phase precisely. When the needle tip makes contact with the simulator skin surface, the point of contact is considered as the skin puncture point. As the needle tip advances into fistula models, if the needle successfully gets into the fistula space, due to the infrared detector/emitter pair, users should see a red LED flashing by where users hold the needle wings as a sign of simulated blood flashback.

The IR-based needle tip location estimation system may estimate the needle tip location inside the fistula using a series of IR emitters actuated at different frequencies, placed inside of the fistula (either a curved or a straight fistula), and an IR detector integrated inside a needle used for the cannulation simulation. To indicate successful cannulation without any infiltration, when the needle is inserted correctly into the fistula, the detector picks up the emitted signal from the IR emitters and lights a red LED in the cannula to simulate a blood flashback.

The IR emitters may be actuated at unique frequencies so that, through proper signal processing, the voltage readings from the IR detector that is attached to the needle may present IR exposure from each emitter and, thus, estimate the needle tip location inside the fistula. In examples where there are four IR emitters (e.g., for a certain type of straight fistula model) that are actuated at 4 different frequencies, the frequencies may be set at frequencies that are varied enough for an IR detector to adequately determine a position based on the strength of the detected frequencies. For instance, the four frequencies may initially be set at 30 Hz, 340 Hz, 730 Hz, and 1200 Hz. These are just example frequencies, and the exact frequencies may vary depending on a number of factors, including a number of emitters, the specific type of electronic components, as well as whether the model is a straight or curved fistula model.

The various IR emitters may be embedded atop a filter circuit. A circuit design of the signal processing unit may use fourth order (e.g., two-second order cascaded) narrow bandpass filter circuits for each frequency to filter out the four frequencies of the IR emitters. Other circuit designs may be used in other examples, with the purpose of the circuit being to filter the four frequencies of the IR emitters. The circuit may also be designed with a gain of a certain amount (e.g., 10, or 20 dB) at the center frequency for each unit, for both positive and negative voltage power supply. In addition to, or in place of, hardware filtering, software methods may also be used for this purpose (e.g., implementing a 4th-order Butterworth filter in C++ code).

In examples where four IR emitters are utilized, the reading outputted by the IR detector sensor is passed through the filter circuit which yields four independent voltages corresponding to the amount of IR detected from each emitter. The four output voltages from the filter circuit are a function of the needle's proximity toward the four IR emitters.

IR detector output=f(IR emitter frequency,distance)
Needle tip location=f($V_{RMS}$ from each filter)

In order to include the free motion of the needle in the X-direction, X-Y direction, X-Y-Z-direction, and roll motion of the needle, the dynamic controlled experimental setup for the system may be expanded to allow the motion of the needle in the X-direction, X-Y direction, X-Y-Z-direction, and roll motion of the needle.

Constraining the motion of the needle in Y-direction and Z-direction and only allowing dynamic motion of the needle in the X-direction, the calibration testing panel may consist of a line of IR emitters and a series of pre-defined regions (e.g., four regions for four IR emitters, or five regions for five IR emitters) based on the silicone fistula model. Also, based on the dimensions of the silicone fistula model, the maximum needle motion inside the fistula in the X-direction can be up to the full length of the fistula. Thus, the experimental setup may be based on the maximum distance the needle can travel in the X-direction inside the fistula. A user may dynamically move the needle in the X-direction along the experimental setup and collect voltage data throughout several trials from the filter circuit to build a voltage model for the X-direction. Thus, looking at the distribution of voltages from all four filters, the system may derive a set of hard threshold voltage reading values for the four specific pre-defined regions.

Constraining the motion of the needle in the Z-direction and allowing dynamic motion of the needle in the X-Y direction, the user may dynamically move the needle in X-Y direction along the experimental setup. Again, based on the dimensions of the silicone fistula model, the maximum needle motion inside the fistula in Y direction can be equal to a diameter of the fistula model. The user may then dynamically move the needle in the X-Y direction along the experimental setup and collect voltage data throughout several trials from the filter circuit. Similarly, the system may derive a set of hard threshold voltage reading values for each of the four pre-defined regions from the distribution of voltages from all four filters, thus fine-tuning the four regions for dynamic needle motion in X-Y direction (for instances where there are four emitters and four regions).

Allowing dynamic motion of the needle in X-Y-Z direction, without roll motion of the needle, the user may dynamically move the needle in the X-Y-Z direction, along the experimental setup. Based on the dimensions for the fistula model, the maximum needle motion inside the fistula in Z-direction can be also equal to the diameter of the fistula model. Needle holder modules may be used on the experimental setup to incorporate the maximum distance the needle can travel in the Z-direction. The user may then dynamically move the needle in the X-Y-Z direction along the experimental setup and collect voltage data throughout several trials from the filter circuit. The system may derive a set of hard threshold voltage reading values for each of the four pre-defined regions the distribution of voltages from all four filters, thus fine-tuning the four regions for dynamic needle motion in X-Y-Z direction.

To include X-Y-Z-motion of the needle along with roll motion, on the same experimental setup, with the help of electromagnetic (EM) data from other sensors in the system, the system may find an approximate range of the roll motion (angle) and conduct the same experiment as for the dynamic motion of the needle in X-Y-Z direction along with roll.

Once the system is built with the hard-coded threshold values for each of the four regions, the system may implement an automatic iterative self-calibration code to adjust the threshold values for each of the regions. By performing a standard needle placement procedure, the actual needle positions may be used as inputs for the reference, to self-adjust the threshold values. The adaptive thresholding will also take into consideration the voltage pattern across all four filters during the dynamic motion of the needle. The performance of such sensors may be highly dependent on the external environment, such as room lighting. Having a self-calibrated adjustable code may help overcome the challenges of deploying the proposed device to wide variety of clinical settings.

The regions may be fine-tuned in an effort to eliminate overlapping regions in needle location estimation near the boundaries of the regions. The system may also be limited to roll and yaw motion of the needle for obtaining the desired accuracy of needle tip location estimation. To overcome this issue, the system may implement a boundary condition for the roll and yaw motion of the needle (e.g., in order to obtain the desired accuracy of needle tip location estimation, the roll motion should be limited 60 degree)

During the needle insertion process, the needle insertion angle is calculated based on the location of the needle tip over a grid of time points, which forms a time series. Each needle tip location is mathematically connected to the skin puncture point to form a vector, which is then used to calculate the angle between itself and the skin surface normal vector. Using such a calculated angle and subtracting from 90° should result in the proper needle insertion angle. Observations having high scores on this first principal component tend to have flatter-than-average angles (lower values in degrees), especially avoiding steepness (higher values in degrees) during a key period one-fourth of the way through the insertion. A slightly slower rate of angle decreasing is possibly explained by inefficient needle trajectory, and brings a higher chance of inserting the needle too deep. Assuming that a lower angle allows the participant to more safely control how deep the needle goes, lower angles may be preferable. In both cases, the majority of the angles stay above 45° through the length of the trial. Although it is possible for the needle to travel in such a fashion and still avoid infiltration, the chance of infiltration and failure to secure the needle in a safe location drastically increases with such a steep angle. Additional dangerous behaviors include when the needle tracking graph exhibits a strange oscillating pattern while maintaining a reasonable angle. The strange oscillating pattern can be interpreted as a "digging" motion. When participants cannot achieve stable flashback, some may choose to tilt the needle up and down or to retract the needle halfway out for an extra attempt in order to find the secure location. During this process, not only is the chance of unnecessary tissue damage severely increased, but also patients are put in great danger of major infiltration.

Magnitude of the insertion angle curves reflects the average insertion angle, and slope or shape of the curves delivers a similar message about the derivative of insertion angle, but they both display more details about timing and fluctuations within each trial. When used in training programs, instead of offering trainees a simple measure of average insertion angle by an expert instructor, a future training system could automatically compare users' insertion angle to a specific preferred style. The visual presentation of insertion angle curves during the whole task can help instructors teach trainees how to be safe beyond just keeping the initial insertion angle within the guidelines. Whether it is a problem of high insertion angle or "digging", trainees can pay attention to the particular areas that need improvement. For example, "digging" can be caused by confusion about the actual location of the fistula, so instructors can remind trainees to take more time and effort in palpation before inserting the needle. Using FDA, a simulator-based training system can analyze motion data seamlessly with objective assessment on how to improve cannulation.

Needle "shaking" may also reflect the smoothness of needle insertion angle during the cannulation. To better quantify the insertion performance during an attempt, the angle-based metrics was extracted in two main scales (the whole segment(S) and the sub-segments of the attempt if having flashback). The sub-segments of an attempt included before flashback ($s_1$) and after flashback ($s_2$). For the needle "shaking" (LDLJ($\alpha$)), all its metrics are significantly correlated with outcome metrics. They are negatively correlated with the number of infiltration (num_infil), while positively correlated with flash ratio (FR), flash efficiency (FE), and outcome score (ocScore). The absolute correlation coefficients between needle "shaking" metrics and outcome metrics based on attempts were from 0.2067 to 0.4462. And the absolute correlation coefficients based on trials were from 0.1896 to 0.3804. For the needle "digging" ($\alpha'$), only its metrics on the whole attempt(S) and before flashback ($s_1$) show significantly correlated with outcome metrics. They are positively correlated with the number of infiltration, but negatively correlated with the other three outcome metrics. The absolute correlation coefficients between needle "digging" metrics and outcome metrics were from 0.1319 to 0.2457 based on attempts and from 0.1480 to 0.2400 based on trials. For the average insertion angle ($\bar{\alpha}$), only its metrics are significantly correlated with the flash efficiency and outcome score. The correlation coefficients are from -0.2303 to -0.0863. Hemodialysis cannulation (HDC) includes the following four steps:

Step 1. Identify the point of needle insertion using visual inspection and palpation of the AV fistula;

Step 2. Insert the needle into the fistula at a 20-35° angle with the bevel facing upward;

Step 3. Rotate the needle 180° to prevent back-wall infiltration after blood "flashback" (done in certain conditions); and Step 4. "Level out" and advance the needle for securing it.

Of the four steps mentioned above, the first pertains to determining where to insert the needle, whereas the last three pertain to the needle insertion technique itself. Consequently, for analyzing needle insertion skill, the process may be divided into phases as follows: "Insertion phase" (Phase 1), "Rotation phase" (Phase 2), and "Leveling and forwarding phase" (Phase 3), respectively. These phases are identified by four events: needle tip entering the skin surface, pausing insertion before rotating, finishing needle rotation, and completing advancing the needle. The four events are simultaneously recorded by both the camera outside the simulator and the electromagnetic tracker. There may be a time delay between the synchronized camera video and the EM tracking data when detecting the same event, because of different sampling frequencies. It may be assumed that the time delay between the camera and EM tracker is constant. The four event time points with respect to camera video (CT) were noted by manual inspection done by the authors during data processing. The time delay ($t_{delay}$) was calculated by averaging the time differences between a first camera and the EM sensor at the first two events. Subsequently, the corresponding time points in the EM data stream, denoted EMT, at the last two events were obtained by subtracting the time delay ($t_{delay}$) from the corresponding time points with respect to the camera video (CT) to extract the phase specific motion metrics of the needle tip.

In order to perform cannulation workflow segmentation and metrics extraction, three spatial planes were defined as the skin surface plane, the fistula plane and the cross sectional plane of the fistula. The skin surface plane was determined by fitting the equation of a plane with several point positions measured on its surface using the EM tracker. The fistula plane was determined by fitting any three of the four measured vertices ($P_a$, $P_b$, $P_c$, and $P_d$) of its plane. The axial line ($P_e P_f$) of the fistula was determined by calculating the middle points on its short sides. The cross sectional plane was calculated as perpendicular to the fistula plane with Pe as its center.

The needle motion metrics extracted from sensor data can be used to quantify cannulation insertion skills. The very first step for a successful cannulation is to find the orientation of the fistula correctly through palpation. Two metrics, the start point accuracy and the lateral angle of the needle, indicate whether the location and the orientation of the fistula are found correctly during the procedure. During needle insertion, other process metrics are computed that assess the subject's technique during cannulation, including completion time, path length traversed by the needle tip, average velocity, average insertion angle, and average rate of change of insertion angle. Simulator-based outcome metrics measure the outcome of the HDC task on the simulator, that is, whether infiltration occurs during or after the task. Two outcome metrics, infiltration risk and final needle tip position, are computed.

Needle location features may also be utilized. $a_0/a_1/a_2$ may be the distance between the projected needle tip position (P') and the fistula's middle axis, which measures how far the needle tip position is from the safest path. $\beta_{01}/\beta_{12}/\beta_{02}$ may be the angle between the needle tip trajectory and its perfect insertion trajectory, which measures how much the insertion motion deviates from the ideal path. $dM_0/dM_1/dM_2$ maybe the distance between the needle tip position and the motor location, with the motor used to mimic the anastomosis in this experiment, which measures how far the needle tip is from anastomosis.

The metrics may also include threshold selection features. These binary features are produced based on whether a certain behavior has exceeded a certain threshold. For instance, if a subject pauses for an extended time between starting the insertion and seeing first flashback, it is reasonable to believe it is a sign of confusion relating to a lower skill level. When the magnitude of some metrics exceeded a certain quantitative threshold, it is considered a change in quality. These binary features are pairwise multiplied by other features for behavior selection.

Examples of each of the above metrics are shown in the below Table 1:

TABLE 1

Feature Definitions

| Category | Feature Variable | Equation/Criteria | Interpretation |
|---|---|---|---|
| Statistical features | AAD(V/F) | $\frac{1}{L}\sum_{j=0}^{L-1} abs(x(j) - \bar{x})$ | The average absolute difference between the value of each element of each variable and the mean of all elements in that variable (L denotes the length of the data) |
| | ARS(V/F) | $\frac{1}{L}\sum_{j=0}^{L-1} (x(j))^2$ | The average of the root sum of squares level of each signal variable. |
| | ARD(V/F) | $\frac{1}{L}\sum_{j=0}^{L-1} (x(j) - \bar{x})$ | The average difference between the value of each element of each variable and the mean of all elements in that variable. |
| Cannulation behavior | $t_u$ | $t_u = \sum_{j=0}^{L-1} t(j) U(j)$<br>$U(j) = \begin{cases} 1, & \text{if } z(j) < z_{surface} \\ 0, & \text{if } z(j) > z_{surface} \end{cases}$ | The total duration of needle tip moving under the skin surface. |
| | $PL_u$ | $\sum_{j=0}^{L-1} \sqrt{(x_{L+1} - x_L)^2 + (y_{L+1} - y_L)^2 + (z_{L+1} - z_L)^2} U(j)$ | The total needle tip path length while moving under the skin surface. |
| | $FI_u$ | $FI_u = \int_{t_{entry}}^{t_{end}} f(t(j)u(j))dt$ | The integrated pinch force strength while needle tip moving under the skin surface. |
| | $Angle_u$ | | The average needle angle while needle tip moving under the skin surface. |
| Motion smoothness | LDLJ(V) | $LDLj(V) = -\ln \left| \frac{T^5}{PL^2} \int_{t_{entry}}^{t_{end}} \frac{(d^3X)^2}{dt^3} \right|$ | The natural log of jerk integrated and squared. |
| | SPARC(V) | $SPARC(V) = \int_0^{r\omega c} \left[ \left(\frac{1}{\omega_c}\right)^2 + \left(\frac{dV(\omega)}{d\omega}\right)^2 \right]^{\frac{1}{2}} d\omega$ | The arc length of the Fourier transform of the velocity profile. |
| | Frgh | $Frgh = \sum_{j=2}^{L} (f(j) - 2f(j-1) + f(j-2))^2$ | The accumulated square of second-order derivative of pinch force. |
| Threshold selection features | binStop | Whether there is a stop/hesitation before reaching to first flashback. | Separating motion with obvious interruption from uninterrupted trials. |
| | binSteer | Whether the fast needle steering motion (detected by the change of needle orientation) has exceeded 50 frames in total, per trial. | Separating aimless needle digging trial from needle insertion with clear target. |
| | binFpks | Whether there has been more than 3 major peaks in pinch force data, per trial. | Identifying a certain cannulation style that applies more sudden force to the needle. |

TABLE 1-continued

Feature Definitions

| Category | Feature Variable | Equation/Criteria | Interpretation |
| --- | --- | --- | --- |
| | $bina_0$ | Whether $a_0$ is greater than 10 mm | Identifying clear wrong judgement of fistula location. |
| | $bina_2$ | Whether $a_2$ is greater than 5 mm | Identifying clear danger of infiltration. |
| | $bin\beta_{02}$ | Whether $\beta_{02}$ is greater than 20 degrees. | Identifying insertion style that is very susceptible to infiltration. |

During experimentation, certain of these metrics may prove to have a stronger positive correlation to cannulation success, such as binStop, ARD(F)+binStop, clt$_i$+binFpks, LDLJ(V), ARD(F), and SPARC(V), although further experimentation may prove different metrics have a stronger positive correlation with cannulation success. For example, binStop is the most impactful feature, and it can be interpreted as showing signs of stop or hesitation after inserting the needle into the simulator before seeing flashback. Another example is that LDLJ(V) ranks highly on the list of features that positively impact the score. The value of LDLJ(V) is always negative and the closer it is to zero, the higher motion smoothness it reflects. Since LDLJ(V) represents the motion smoothness measured by needle tip velocity, it may be fair to interpret any sudden needle tip jerk as obstructing a better outcome. Such results further validate the power of third-derivative based motion smoothness metrics in terms of assessing medical task performance. Another discovery that is consistent with opinions from clinicians is that keeping the needle trajectory angle low with caution is important to gain preferred outcomes.

Other than motion based metrics, pinch force may impact outcome. The large positive coefficient associated with ARD(F) may appear to reinforce discussions within the dialysis community about how more experienced clinicians can teach novices about using a light-handed style rather than a heavy-handed style. Because higher ARD(F) implies for a higher average difference between the value of each element and the mean of pinch force, higher ARD(F) values can be associated with the style of applying high pinch force with focus only at moments, instead of constantly applying high pinch force all the time, which often results in applying too much force through the needle to patients. This quantitative metric can be a teaching tool for instructors who wish to pass on a more light-handed cannulation style to trainees. Because the features that matter the most to outcomes have been identified and measured on a continuous objective scale, it enables future training to emphasize more on such features with comparable references and eventually achieve intuitive training. These values can be incorporated into a training interface, which provides constructive feedback to users. For instance, when users are informed of where their performance features rank among the test population and the preferable values for each feature, they can improve on specific aspects of the cannulation task on the simulator through practice. Therefore, users can learn from trial-based instructions on how to achieve a better score, with reduced cost of manual power and reduced workload from instructors.

Similarly, some metrics may prove to have a stronger negative correlation to cannulation success, such as PL$_u$, PL$_u$+binStop, FL$_u$+binStop, Avg(V), PL$_u$+binFpks, Angle$_u$, and SD(V), although further experimentation may prove different metrics have a stronger positive correlation with cannulation success. As such the model may use particular weights to account for the positive and negative correlations. In examples where the model is a machine learning model, as more data becomes available and more certainty is gathered as to what metrics positively and negatively correlate with cannulation success, the machine learning model may adjust the weights to account for the updated information.

As such, it is clear that certain metrics, which are ultimately determinable based on measurements performed by the various sensors described herein, indicate a particular skill level of a medical professional performing a cannulation. With a baseline of initial measurements, such as those described above, the system described herein may analyze a particular user's cannulation simulation and provide an assessment as to where that user falls on the spectrum between (and outside of) expert and novice.

Figure 2:
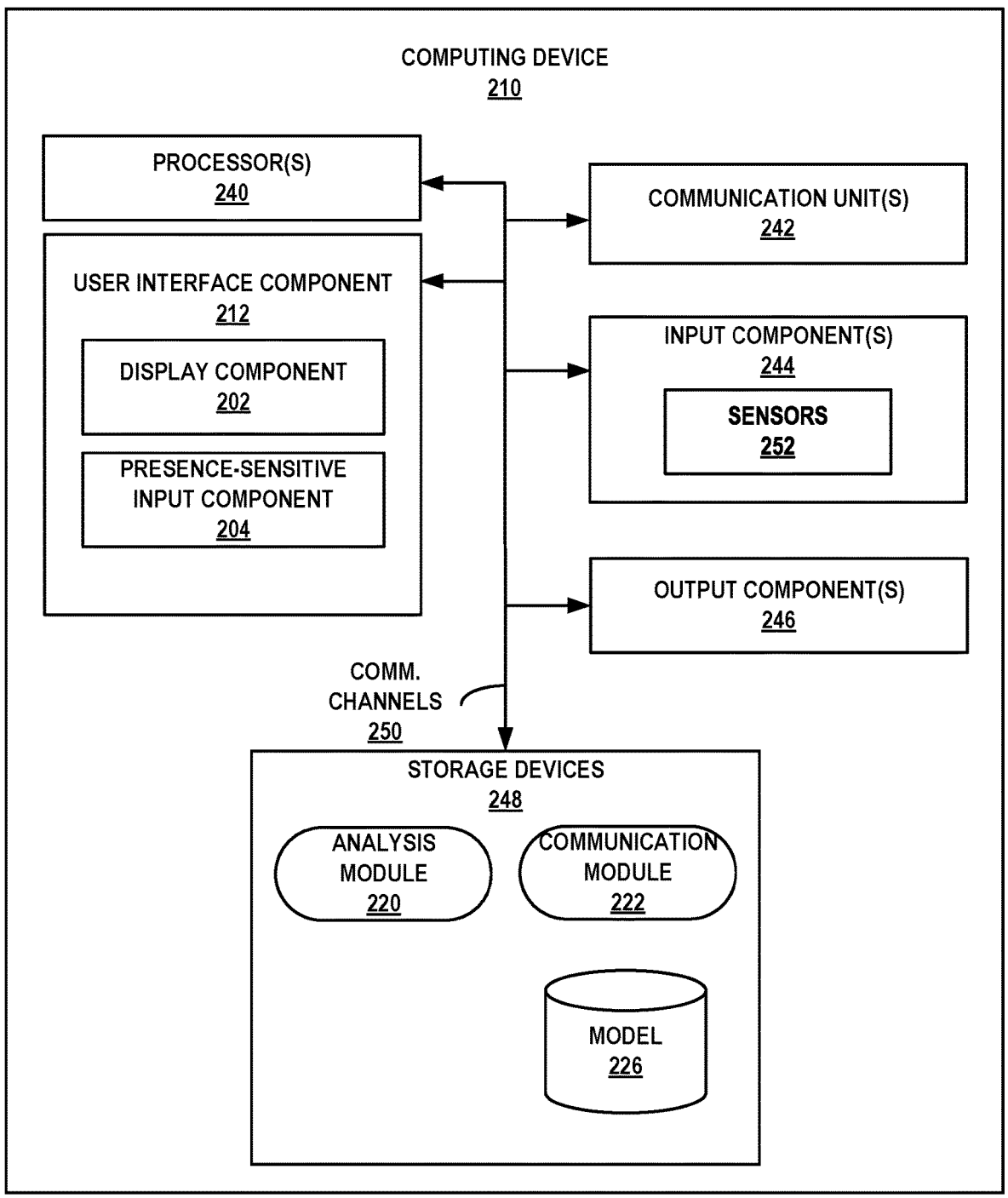
FIG. 2 is a block diagram illustrating a more detailed example of a computing device configured to perform the techniques described herein.

FIG. 2 is a block diagram illustrating an example computing device configured to receive data measured by sensors and analyze that data to ultimately determine a performance metric for a user performing a physical cannulation simulation, in accordance with one or more aspects of the techniques described in this disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, computing device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include analysis module 220, communication module 222, and model 226.

One or more processors 240 may implement functionality and/or execute instructions associated with computing device 210 to calculate a metric descriptive of either an absolute performance or a relative performance for a user during a physical cannulation simulation. That is, processors 240 may implement functionality and/or execute instructions associated with computing device 210 to analyze a user's performance with respect to a threshold using various metrics indicative of a successful cannulation procedure.

Examples of processors 240 include application processors, display controllers, auxiliary processors, one or more sensor hubs, and any other hardware configure to function as a processor, a processing unit, or a processing device. Modules 218, 220, 222, and 224 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222. The instructions, when executed by processors 240, may cause computing device 210 to analyze sensor data to determine a metric of a user's absolute performance or the user's relative performance during a physical cannulation simulation.

Analysis module 220 may execute locally (e.g., at processors 240) to provide functions associated with calculating a metric of a user's performance during a physical cannulation simulation. In some examples, analysis module 220 may act as an interface to a remote service accessible to computing device 210. For example, analysis module 220 may be an interface or application programming interface (API) to a remote server that analyzes sensor data to assess a user's skills during a physical cannulation simulation.

In some examples, communication module 222 may execute locally (e.g., at processors 240) to provide functions associated with communicating with various sensors and output devices. In some examples, communication module 222 may act as an interface to a remote service accessible to computing device 210. For example, communication module 222 may be an interface or application programming interface (API) to a remote server that receives data generated by and transmitted by the sensors, as well as communicates with various output devices.

One or more storage components 248 within computing device 210 may store information for processing during operation of computing device 210 (e.g., computing device 210 may store data accessed by modules 220 and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222, and model 226. Storage components 248 may include a memory configured to store data or other information associated with modules 220 and 222, and model 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras) one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques of this disclosure, computing device 210 may be integrated with a physical cannulation simulator and one or more sensors external to computing device 210. Each sensor of the one or more sensors is configured to measure data during a physical cannulation simulation by a first user using the physical cannulation simulator. The one or more sensors may include any one or more of an optical hand tracking sensor system, a pressure sensor system, an electromagnetic position sensor system, an infrared sensor system, and an external camera system.

The optical hand tracking sensor system may include an optical hand tracking sensor module installed above the physical cannulation simulator. The pressure sensor system may include an arrangement of one or more pressure sensors wearable on a hand of the first user. The arrangement of the one or more pressure sensors may include a pressure sensor set on a tip of each of one or more fingers of the hand of the first user when worn on the hand of the first user.

The electromagnetic position sensor system may include an electromagnetic position generator located external to the physical cannulation simulator, such as below the physical cannulation simulator or anywhere at a known distance away from the physical cannulation simulator, and an electromagnetic position sensor located inside or on a needle held by the user during the physical cannulation simulation.

The infrared sensor system may include one or more infrared emitters located within the physical cannulation simulator and an infrared sensor located in or on a needle held by the user during the physical cannulation simulation. The infrared emitters may further be arranged throughout a simulated fistula within the physical cannulation simulator. In such instances, analysis module 220 may estimate a needle tip location based on data output by the infrared detector.

In some instances, the plurality of infrared emitters may include a series of infrared emitters embedded atop a filter circuit, with each of the series of infrared emitters being actuated at different frequencies. In such instances, the data output by the infrared detector may be an amount of infrared received of each frequency, and the series of infrared emitters may be arranged in order of increasing frequency. In these instances, the filter circuit may receive the amount of infrared received of each frequency from the infrared detector and output that voltage data to analysis module 220 via communication module 222. Analysis module 220 may compare the voltage data to a voltage model trained based at least in part on one or more characteristics of the series of infrared emitters, spacing measurements between each infrared emitter in the series of infrared emitters, and one or more characteristics of the infrared detector. Analysis module 220 may determine an X-Y-Z position of the infrared detector within the simulated fistula based on the comparison of voltage data and the voltage model. Additionally, the position may be a series of positions, with the voltage data being a series of voltage measurements captured at different moments throughout the physical cannulation simulation. Further, the X-Y-Z position of the infrared detector within the simulated fistula may be a series of X-Y-Z positions of the infrared detector within the simulated fistula at the different moments throughout the physical cannulation simulation. As such, the system may continuously monitor the needle position throughout the physical cannulation simulation to effectively track the needle while the needle is inserted into the simulated fistula.

In some instances, the data measured by any of the one or more sensors may include one or more of hand position data, finger position data, needle insertion pressure data, time series data, touchpoint data, force data, needle location data, needle presence data (e.g., the infrared sensor system detecting the presence of the needle at a particular location in a binary form), and needle movement data.

Communication module 222 may receive the data measured by each of the one or more sensors. Analysis module 220 may calculate a plurality of metrics using the data, the metrics being indicative of some aspect of the physical cannulation simulation. In some instances, analysis module 220 may further extract, based on an initial calibration for each of the one or more sensors and segmentation of the data, a threshold for each of the plurality of metrics.

Each metric of the plurality of metrics may include one or more of a time metric, a location metric, a force metric, a statistical feature, and a threshold selection feature. In other words, the metrics may fall into any of the above listed categories. Time metrics may include any one or more of a total time from a start of a palpation to an end of the palpation, and a total duration of a needle tip moving under a skin surface of the physical cannulation simulator, or any time-based information indicative of some aspect of a physical cannulation process during a physical cannulation simulation. The location metric may include any one or more of a ratio of correct movement, a ratio of accurate touchpoints, a path length, a distance to motor, a needle tip path length, an average needle angle, a velocity profile, or any other location-based information for the cannulation needle or the hands of the user that are indicative of some aspect of a physical cannulation process during a physical cannulation simulation The force metric may include one or more of a touchpoint total, a touch frequency, a touchpoint time, a touchpoint force, a force integration, a jerk metric, a pinch force metric, or any other force-based information indicative of some aspect of a physical cannulation process during a physical cannulation simulation. The statistical feature may include any one or more of an average absolute difference between each metric and a mean value for the respective metric, an average of a root sum of squares for each metric, an average difference between each metric and the mean value for the respective metric, or any other advanced statistical calculation performed on various metrics as compared to other metrics or a population value for the metric. The threshold selection feature may include any one or more of an indication of a hesitation before reaching a first flashback, an indication of a fast needle steering motion, an indication of more than a threshold number of major peaks in pinch force data, an incorrect judgment of a fistula location, an indication of infiltration danger, a dangerous infiltration angle, or any other feature extracted from the known information of the physical cannulation simulation.

It should be noted that the above metrics are merely examples of possible metrics that fall into the various categories contemplated herein. However, it should be known that other metrics could be calculated and used in evaluating a physical cannulation simulation performed by a user. Any metric calculable from data collected by the sensors described herein could be used to determine a composite simulation score, as described herein, and are contemplated by this disclosure.

Analysis module 220 may apply model 226 to the plurality of metrics to determine a composite simulation success score. Analysis module 220 may further compare the composite simulation success score to a threshold score. In response to analysis module 220 comparing the composite simulation success score to the threshold score, communication module 222 may output an indication (e.g., a graphical, audible, or visible indication) on one of output components 246 of one or more of an absolute performance (e.g., the composite simulation score itself or a pass/fail indication when compared to the threshold) or a relative performance (e.g., a comparison of the composite simulation score to the threshold or some other population of composite simulation scores) for the first user during the physical cannulation simulation. In other instances, analysis module 220 may not compare the composite simulation success score to a threshold, and may simply output an indication the absolute performance or the relative performance without the comparison to the threshold.

In some instance, model 226 may be a series of weights to apply to each metric of the plurality of metrics, with the composite simulation score being a product or sum of the weighted metrics. Model 226, additionally or alternatively, may be a machine learning model. In such examples, after outputting the indication of the one or more of the absolute performance or the relative performance for the first user during the physical cannulation simulation, communication module 222 may receive an input as to whether the first user passed or failed the physical cannulation simulation. Based on the composite success score and whether the composite success score indicated a passing or failing of the physical cannulation simulation, analysis module 220 may adjust model 226 (e.g., adjusting the weights of model 226) based on the input as to whether the indication of the first user passing or failing the was correct.

The above system provides a number of benefits. Using the described system, an instructor can ascertain the use of a cannulation simulator for skill assessment using objective metrics to differentiate experts and novices. For instance, the results suggest that vascular palpation may be quantified using objective metrics. In addition, these metrics can demonstrate differences in skill between expert and novice technicians. Experts performed the task more confidently and intentionally, taking a shorter amount of time, having a higher ratio of correct movement, and having a shorter path length. These metrics can be applied in the training of palpation skill by providing objective quantification of palpation behavior. The differentiation of subjects into experts and novices "binarizes" skill into two groups. Skill, however, can be conceptualized as being on a continuum rather than in two (or three) discrete levels. In these ways, the system of physical simulators, sensors, and analyzing modules can improve the efficacy of simulation training for medical professionals by providing accurate, valuable, and near-immediate objective feedback.

Figure 3:
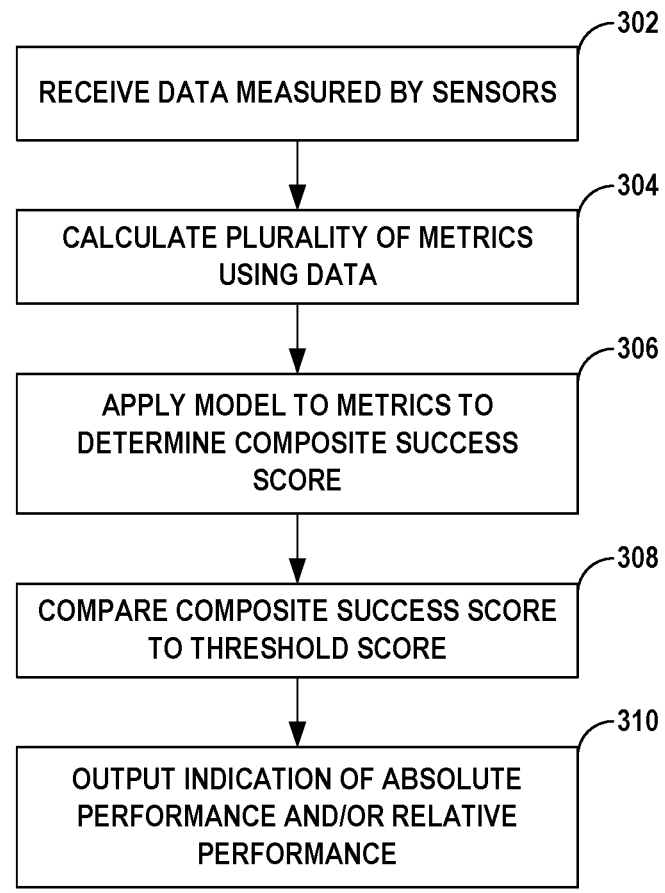
FIG. 3 is a flowchart illustrating an example technique performed by a computing device configured to analyze data produced by the sensors to assess a user's performance during a physical cannulation simulation.

FIG. 3 is a flow chart illustrating an example mode of operation. The techniques of FIG. 3 may be performed by one or more processors of a computing device, such as system 100 of FIG. 1 and/or computing device 210 illustrated in FIG. 3. For purposes of illustration only, the techniques of FIG. 3 are described within the context of computing device 210 of FIG. 3, although computing devices having configurations different than that of computing device 210 may perform the techniques of FIG. 3.

In accordance with the techniques of this disclosure, communication module 222 receives data measured by each of one or more sensors (e.g., sensors 112, 114, 116, 118, 120, and 122 of FIG. 1) (302). Analysis module 220 calculates a plurality of metrics using the data (304). Analysis module 220 applies model 226 to the plurality of metrics to determine a composite simulation success score (306). Analysis module 220 compares the composite simulation success score to a threshold score (308). In response to comparing the composite simulation success score to the threshold score, communication module 222 outputs an indication of one or more of an absolute performance or a relative performance for the first user during the physical cannulation simulation (310).

Although the various examples have been described with reference to preferred implementations, persons skilled in the art will recognize that changes may be made in form and detail without departing from the spirit and scope thereof.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A system comprising:
   (a) a physical cannulation simulator;
   (b) one or more sensors, wherein each sensor of the one or more sensors is configured to measure data during a physical cannulation simulation by a first user using the physical cannulation simulator, wherein the one or more sensors comprise an infrared sensor system, and wherein the infrared sensor system comprises an infrared detector in or on a needle tip and a plurality of infrared emitters arranged throughout a simulated fistula within the physical cannulation simulator, wherein the plurality of infrared emitters comprises a series of infrared emitters embedded atop a signal processing circuit, wherein the series of infrared emitters are arranged in order of increasing frequency, wherein each in the series of infrared emitters are actuated at different frequencies, and wherein the data output by the infrared detector comprises an amount of infrared received of each emitter signal; and
   (c) one or more processors, wherein the signal processing circuit receives the amount of infrared received of each signal from the infrared detector and outputs voltage data to the one or more processors, wherein the one or more processors are configured to:
      (i) receive the data measured by each of the one or more sensors;
      (ii) calculate a plurality of metrics using the data, wherein calculating the plurality of metrics includes:
         (1) estimate a needle tip location based on data output by the infrared detector;
         (2) compare the voltage data to a voltage model trained based at least in part on one or more characteristics of the series of infrared emitters, spacing measurements between each infrared emitter in the series of infrared emitters, and one or more characteristics of the infrared detector; and
         (3) determine an X-Y-Z position of the infrared detector within the simulated fistula based on the comparison of voltage data and the voltage model;
      (iii) apply a model to the plurality of metrics to determine a composite simulation success score;
      (iv) compare the composite simulation success score to a threshold score; and
      (v) in response to comparing the composite simulation success score to the threshold score, output an indication of one or more of an absolute performance or a relative performance for the first user during the physical cannulation simulation.

2. The system of claim 1, wherein the one or more sensors comprise one or more of:
   (a) an optical hand tracking sensor system;
   (b) a pressure sensor system;
   (c) an electromagnetic position sensor system;
   (d) an infrared sensor system; and
   (e) an external camera system.

3. The system of claim 2, wherein the optical hand tracking sensor system comprises an optical hand tracking sensor module installed above the physical cannulation simulator.

4. The system of claim 2, wherein the pressure sensor system includes an arrangement of one or more pressure sensors wearable on a hand of the first user, wherein the arrangement of one or more pressure sensors includes a pressure sensor set on a tip of each of one or more fingers of the hand of the first user when worn on the hand of the first user.

5. The system of claim 2, wherein the electromagnetic position sensor system comprises an electromagnetic position generator located external to the physical cannulation simulator and an electromagnetic position sensor located inside or on a needle held by the user during the physical cannulation simulation.

6. The system of claim 2, wherein the infrared sensor system comprises one or more infrared emitters located within the physical cannulation simulator and an infrared sensor located in a needle held by the user during the physical cannulation simulation.

7. The system of claim 1, wherein the data comprises one or more of:
 (a) hand position data;
 (b) finger position data;
 (c) needle insertion pressure data;
 (d) time series data;
 (e) touchpoint data;
 (f) force data;
 (g) needle location data;
 (h) needle presence data; and
 (i) needle movement data.

8. The system of claim 1, wherein the one or more processors are further configured to:
 extract, based on an initial calibration for each of the one or more sensors and segmentation of the data, a threshold for each of the plurality of metrics.

9. The system of claim 1, wherein each metric of the plurality of metrics comprises one or more of:
 (a) a time metric;
 (b) a location metric;
 (c) a force metric;
 (d) a statistical feature; and
 (e) a threshold selection feature.

10. The system of claim 9, wherein the time metric comprises one or more of:
 (a) a total time from a start of a palpation to an end of the palpation; and
 (b) a total duration of a needle tip moving under a skin surface of the physical cannulation simulator.

11. The system of claim 9, wherein the location metric comprises one or more of:
 (a) a ratio of correct movement;
 (b) a ratio of accurate touchpoints;
 (c) a path length;
 (d) a distance to motor;
 (e) a needle tip path length;
 (f) an average needle angle; and
 (g) a velocity profile.

12. The system of claim 9, wherein the force metric comprises one or more of:
 (a) a touchpoint total;
 (b) a touch frequency;
 (c) a touchpoint time;
 (d) a touchpoint force;
 (e) a force integration;
 (f) a jerk metric; and
 (g) a pinch force metric.

13. The system of claim 9, wherein the statistical feature comprises one or more of:
 (a) an average absolute difference between each metric and a mean value for the respective metric;
 (b) an average of a root sum of squares for each metric; and
 (c) an average difference between each metric and the mean value for the respective metric.

14. The system of claim 9, wherein the threshold selection feature comprises one or more of:
 (a) an indication of a hesitation before reaching a first flashback;
 (b) an indication of a fast needle steering motion;
 (c) an indication of more than a threshold number of major peaks in pinch force data;
 (d) an incorrect judgment of a fistula location;
 (e) an indication of infiltration danger; and
 (f) a dangerous infiltration angle.

15. The system of claim 1, wherein the model comprises a series of weights to apply to each metric of the plurality of metrics.

16. The system of claim 1, wherein the model comprises a machine learning model.

17. The system of claim 16, wherein the one or more processors are further configured to:
 after outputting the indication of the one or more of the absolute performance or the relative performance for the first user during the physical cannulation simulation, receive an input as to whether the first user passed or failed the physical cannulation simulation; and
 adjust the model based on the input as to whether the indication of the first user passed or failed the physical cannulation simulation and the comparison of the composite simulation success score to the threshold score.

18. The system of claim 1, wherein the voltage data comprises a series of voltage measurements captured at different moments throughout the physical cannulation simulation, and wherein the X-Y-Z position of the infrared detector within the simulated fistula comprises a series of X-Y-Z positions of the infrared detector within the simulated fistula at the different moments throughout the physical cannulation simulation.

19. A method to quantify cannulation skills on a physical cannulation simulator, the method comprising:
 (a) measuring, by one or more sensors, data during a physical cannulation simulation by a first user using the physical cannulation simulator, wherein the one or more sensors comprise an infrared sensor system, and wherein the infrared sensor system comprises an infrared detector in or on a needle tip and a plurality of infrared emitters arranged throughout a simulated fistula within the physical cannulation simulator, wherein the plurality of infrared emitters comprises a series of infrared emitters embedded atop a signal processing circuit, wherein the series of infrared emitters are arranged in order of increasing frequency, wherein each in the series of infrared emitters are actuated at different frequencies, and wherein the data output by the infrared detector comprises an amount of infrared received of each emitter signal;
 (b) receiving, by one or more processors, the data measured by each of the one or more sensors, wherein the signal processing circuit receives the amount of infrared received of each signal from the infrared detector and outputs voltage data to the one or more processors;
 (c) calculating, by the one or more processors, a plurality of metrics using the data, wherein calculating the plurality of metrics includes:
  (i) estimate a needle tip location based on data output by the infrared detector;

(ii) compare the voltage data to a voltage model trained based at least in part on one or more characteristics of the series of infrared emitters, spacing measurements between each infrared emitter in the series of infrared emitters, and one or more characteristics of the infrared detector; and (iii) determine an X-Y-Z position of the infrared detector within the simulated fistula based on the comparison of voltage data and the voltage model;

(d) applying, by the one or more processors, a model to the plurality of metrics to determine a composite simulation success score;

(e) comparing, by the one or more processors, the composite simulation success score to a threshold score; and (f) in response to comparing the composite simulation success score to the threshold score, outputting, by the one or more processors, an indication of one or more of an absolute performance or a relative performance for the first user during the physical cannulation simulation.

20. A non-transitory computer-readable storage medium comprising instructions that, when executed, cause one or more processors to:

(a) receive data measured by each of one or more sensors during a physical cannulation simulation by a first user using the physical cannulation simulator, wherein the one or more sensors comprise an infrared sensor system, and wherein the infrared sensor system comprises an infrared detector in or on a needle tip and a plurality of infrared emitters arranged throughout a simulated fistula within the physical cannulation simulator, wherein the plurality of infrared emitters comprises a series of infrared emitters embedded atop a signal processing circuit, wherein the series of infrared emitters are arranged in order of increasing frequency, wherein each in the series of infrared emitters are actuated at different frequencies, and wherein the data output by the infrared detector comprises an amount of infrared received of each emitter signal, wherein the signal processing circuit receives the amount of infrared received of each signal from the infrared detector and outputs voltage data to the one or more processors;

(b) calculate a plurality of metrics using the data, wherein calculating the plurality of metrics includes:

(i) estimate a needle tip location based on data output by the infrared detector;

(ii) compare the voltage data to a voltage model trained based at least in part on one or more characteristics of the series of infrared emitters, spacing measurements between each infrared emitter in the series of infrared emitters, and one or more characteristics of the infrared detector; and (iii) determine an X-Y-Z position of the infrared detector within the simulated fistula based on the comparison of voltage data and the voltage model;

(c) apply a model to the plurality of metrics to determine a composite simulation success score;

(d) compare the composite simulation success score to a threshold score; and (e) in response to comparing the composite simulation success score to the threshold score, output an indication of one or more of an absolute performance or a relative performance for the first user during the physical cannulation simulation.

* * * * *